June 19, 1962

R. MERZ 3,039,646

GAS CARTRIDGE

Filed Oct. 31, 1960

INVENTOR.
RUDOLF MERZ

BY *J. W. Schlesinger*
ATTORNEY

United States Patent Office 3,039,646
Patented June 19, 1962

3,039,646
GAS CARTRIDGE
Rudolf Merz, Rochester, N.Y., assignor to Crosman Arms Company, Inc., Fairport, N.Y., a corporation of New York
Filed Oct. 31, 1960, Ser. No. 66,253
2 Claims. (Cl. 220—27)

The present invention relates to containers for storing gases under high pressure and more particularly, to small size cylinders or cartridges, such as are used in gas-fired guns, for storing $CO_2$ to supply the compressed gas used in firing such guns. More specifically, the invention relates to the sealing or capping of such containers.

Heretofore most $CO_2$ containers or cartridges have been capped by welding the cap to the container or cartridge. With such containers, however, so much extra room has to be provided in the machine which fills the containers with gas that nearly half as much gas as is charged into a cartridge is lost at each filling operation. Moreover, with prior constructions there is always a high percentage of leaking cylinders or cartridges because it is difficult to seal the caps on the containers. If the leak is detected, this means either that the cartridge has to be discarded or that the welded cap must be cut off the container, and the container resealed. There is a limit, however, as to the extent to which caps can be cut off containers and containers resealed. If the leak should not be detected, the cartridge will rapidly lose pressure, and in a short time will be useless.

One object of this invention is to provide a container of the character described which can be sealed without loss of pressure.

Another object of the invention is to provide a container of the character described which can be sealed without brazing or resistance-welding the cap to the container.

Another object of the invention is to provide a container of the character described, which can be capped easier and with greater security against leakage than containers of this character as previously made.

Another object of the invention is to provide a container of the character described which requires less expensive machinery to fill and cap and seal.

Another object of the invention is to provide a container of the character described which can be filled while cold, and without requiring any heat.

Still another object of the invention is to provide a container of the character described which will have substantially no leakage over long periods of time.

Other objects of the invention will be apparent hereinafter from the specification and the claims when read in connection with the accompanying drawings.

Several different embodiments of the invention are illustrated in the accompanying drawings in which.

Figure 1:
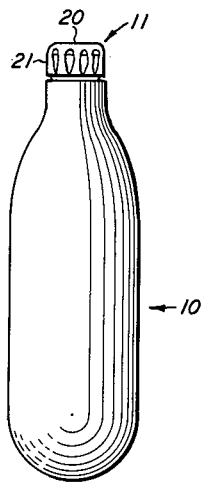
FIG. 1 is a side view of a capped container made according to one embodiment of this invention.
Figure 2:
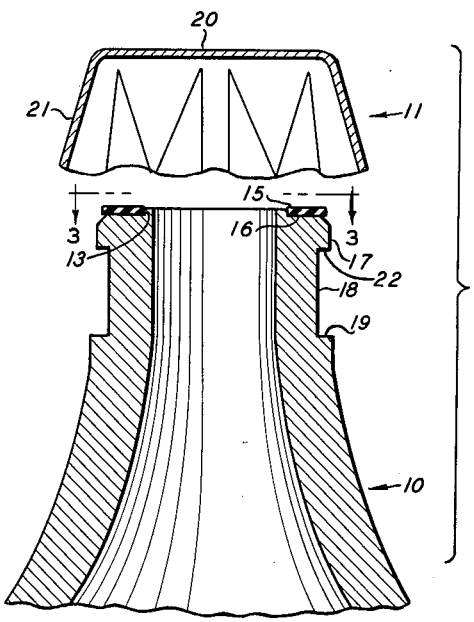
FIG. 2 is an exploded sectional view on an enlarged scale showing the upper part of this container and the cap therefor prior to assembly of the cap on the container.
Figure 3:
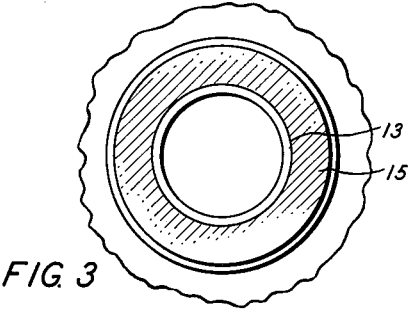
FIG. 3 is a fragmentary plan view of the container showing the cap gasket in place, this view being taken on the line 3—3 of FIG. 2 looking in the direction of the arrows.

Referring now to the drawings by numerals of reference and first to the embodiment of the invention shown in FIGS. 1 to 6 inclusive, 10 denotes generally the hollow metallic container, and 11 the metallic cap which is used thereon.

The container is closed at its lower end and is formed adjacent its top with a neck portion of reduced diameter. Around its mouth the container is formed with an integral ring or collar 13 of narrow width and of slight depth, and below this ring or collar the neck portion of the container is formed with a shoulder or sealing seat 16. A gasket 15 of rubber or other suitable material engages around the collar 13 and seats on the seat 16. Below the seat 16 the neck of the container has a substantially cylindrical peripheral portion 17. Cylindrical portion 17 and seat 16 may be chamfered at their juncture, as shown, to avoid a sharp edge. Beneath the cylindrical portion 17 the container is formed with a peripheral groove 18 of substantial height, which has an axial length substantially greater than the axial length of cylindrical portion 17 (FIG. 2), and which terminates at the shoulder 19. The rest of the container is of conventional shape.

Figure 4:
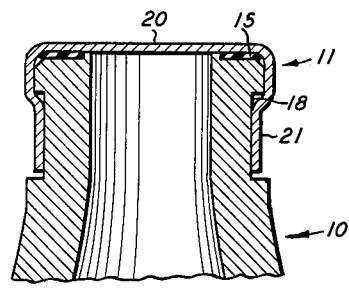
FIG. 4 is a fragmentary sectional view showing the capped container.
Figure 5:
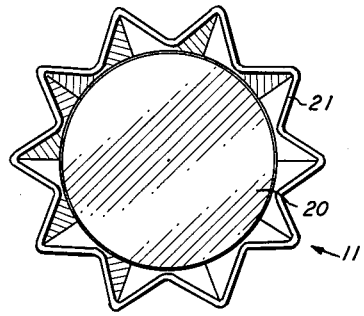
FIG. 5 is a bottom view of the cap before it is pressed over the top of the container.
Figure 6:
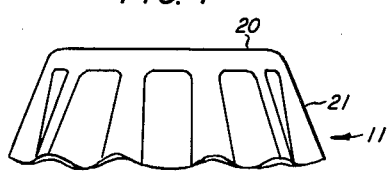
FIG. 6 is a side view of the cap before it is pressed over the top of the container.
Figure 7:
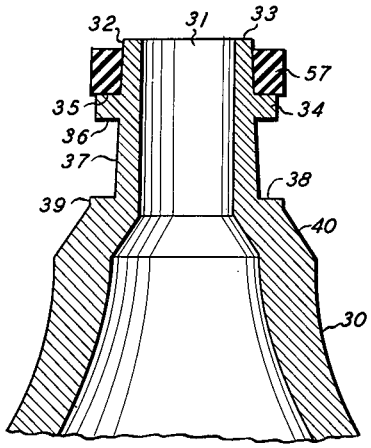
FIG. 7 is a fragmentary sectional view showing a container made according to a somewhat different embodiment of the invention.
Figure 8:
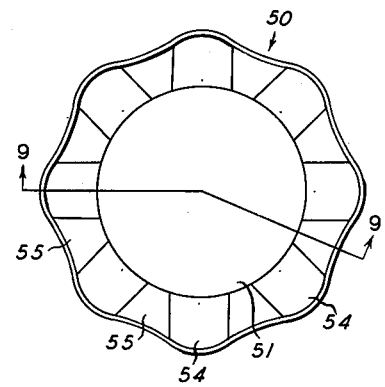
FIG. 8 is a plan view of a cap such as used on this container.
Figure 9:
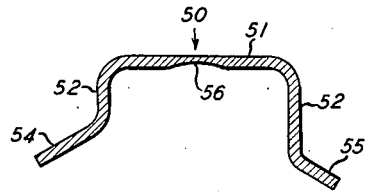
FIG. 9 is a section through this cap taken on the line 9—9 of FIG. 8.
Figure 10:
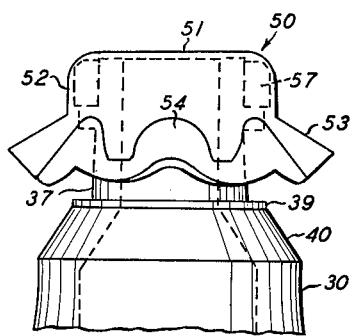
FIG. 10 is a fragmentary side elevation showing the cap assembled on this container.
Figure 11:
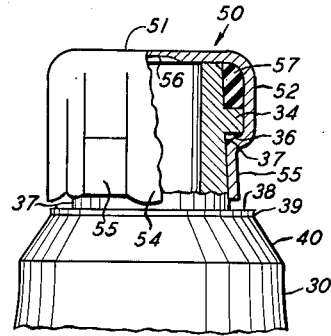
FIG. 11 is a view, partly in elevation and partly in section, showing the cap pressed and crimped into place.

The cap 11 is made of very thin metal so that it may easily be pierced when used in a gas-operated gun. The cap is similar to conventional crown caps. It has a plane top surface 20 and an outwardly flared, corrugated or fluted skirt portion 21 which can easily be pressed into the groove 18. It is adapted to be secured to the container by placing the cap over the top of the container so that the top of the cap seats on the gasket 15 and then squeezing the skirt portion 21 so that it engages within the groove 18 under the shoulder 22 which defines the upper end of groove 18. Skirt portion 21 has an axial length substantially greater than the axial length of cylindrical portion 17, and extends downwardly below the bottom of portion 17 for a sufficient distance so that upon its being squeezed in the groove it grips and engages in the groove 18, thus securely fastening the cap to the container. In crimping the skirt portion into the groove 18, the top 20 of the cap is pressed down on the gasket 15 effectively to seal the container. FIG. 4 shows the cap secured onto the neck of the container.

In the embodiment of the invention shown in FIGS. 7 to 11 inclusive, the container or cartridge 30 has a neck portion 31 which has a slightly conical peripheral surface 32 extending for a portion of its height from its top edge 33 downwardly to a peripheral rib 34 which projects radially outwardly beyond this surface 32. This rib 34 has upper and lower surfaces 35 and 36, respectively, which are slightly conical. Below the rib 34 the neck is formed with a groove 37 whose peripheral surface is conical, whose axial length is substantially greater than the axial length of rib 34 (FIG. 7), and which terminates at a slightly conical shoulder 38. The shoulder 38 terminates radially outwardly at the cylindrical, or the slightly conical peripheral surface portion 39 of the container. This portion 39 is of slight height and adjoins a conical peripheral portion 40 which in turn joins the adjacent conventionally curved body portion of the container or cartridge.

In this latter-described embodiment of the invention, a cap 50 is employed which has a generally plane top surface 51, and a dependent skirt portion 52, which is approximately cylindrical, and which terminates in the flared undulatory rim portion 53. At its center the cap is made of reduced thickness. This can be done by providing the die, on which the cap is shaped, with a protrusion or dimple that forms a slight depression 56 on the underside of the top of the cap, while leaving the upper side of the top of the cap substantially smooth. The depression 56 not only reduces the thickness of the cap at the point where it is pierced in the gun, but workhardens it at this point, thereby to make it easier to pierce it. The rim or flange of the cap has arcuately curved rises 54, which are of substantially uniform width from end to end and which alternate with flat triangular shaped lands 55 that decrease in width from the periphery of the rim or flange to the cylindrical surface 52. Before assembling the cap on the container a cylindrical gasket 57 made of rubber, or similar material, is placed on top of the rib or shoulder 34. This gasket has a height slightly less than the height of the cylindrical portion 32 of the neck of the container. The cap 50 is then placed over the gasket 57 and the neck of the bottle. The cylindrical portion 52 of the cap extends below the gasket 57 but only about half way the height of the rib or shoulder 34, and the skirt portion 53 extends a substantial distance below the bottom 36 of rib 34. The rim or flange 53 is then compressed about the neck of the bottle, by squeezing the skirt 53 inwardly. As a result the triangular land portions 55 are engaged under the rib or shoulder 34 and the arcuate portions 54 are compressed into a cylindrical surface which is an extension of cylindrical surface 52, and the whole cap is compressed around the peripheral surface 37 of the neck to compress the gasket 57 between the plane inside top portion of the cap and the inside of the cylindrical portion 52 of the cap to tightly seal the cap on the container.

While the invention has been described in connection with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. The combination with a hollow metallic container for holding gas under pressure and having a mouth at its upper end and a neck surrounding said mouth, said neck having a peripheral rib projecting therefrom below its mouth and having a peripheral groove below said rib, said rib having a flat lower face and said groove having a substantially cylindrical peripheral wall, a gasket seated on the upper face of said rib and surrounding and engaging the portion of said neck above said rib, and a cap for closing said mouth, said cap having a flat top portion adapted to extend over said mouth and having a skirt portion which extends over said gasket and below said rib, the portion of said skirt disposed below said rib being flared and being undulatory in conformation, the flared undulatory portion of said skirt being compressed to engage under said flat lower face and in said groove to secure said cap on said container, said cap being made of a thin metal which is pierceable to permit escape of gas from the container, said undulatory flared portion having alternate lands and rises, said rises being of arcuate shape in cross section and of substantially uniform width from end to end radially and said lands being of triangular shape and of increasing width radially outwardly, said triangularly shaped lands being pressed into said groove and said arcuate rises being pressed to lie flat against said cylindrical peripheral wall when the cap is pressed on the container.

2. The combination as claimed in claim 1 wherein the top portion of said cap is compressed at its center thereby making it thinner and harder for easy piercing.

References Cited in the file of this patent
UNITED STATES PATENTS

| | | |
|---|---|---|
| 1,744,444 | Carvalho | Jan. 21, 1930 |
| 1,866,841 | Crookshank | July 12, 1932 |
| 2,425,448 | Weida | Aug. 12, 1947 |